United States Patent [19]

Margotte et al.

[11] 4,310,642
[45] Jan. 12, 1982

[54] GRAFT POLYCARBONATES, THEIR PREPARATION AND THEIR USE AS MOLDINGS

[75] Inventors: Dieter Margotte; Werner Nouvertné; Dieter Neuray; Hugo Vernaleken, all of Krefeld, Fed. Rep. of Germany

[73] Assignee: Bayer Aktiengesellschaft, Leverkusen, Fed. Rep. of Germany

[21] Appl. No.: 77,978

[22] Filed: Sep. 24, 1979

[30] Foreign Application Priority Data

Oct. 4, 1978 [DE] Fed. Rep. of Germany ....... 2843154

[51] Int. Cl.³ .............................................. C08L 69/00
[52] U.S. Cl. .................................. 525/468; 525/539; 526/314; 528/370
[58] Field of Search ............... 525/468, 539; 526/314; 528/370

[56] References Cited

U.S. PATENT DOCUMENTS

| | | | |
|---|---|---|---|
| 2,991,273 | 7/1961 | Hechelhammer et al. | 528/174 |
| 2,999,835 | 9/1961 | Goldberg | 528/370 |
| 2,999,846 | 9/1961 | Schnell et al. | 528/171 |
| 3,014,891 | 12/1961 | Goldblum | 528/196 |
| 3,028,365 | 4/1962 | Schnell et al. | 528/196 |
| 3,148,172 | 9/1964 | Fox | 528/199 |
| 3,164,564 | 1/1965 | Butterworth et al. | 260/47 |
| 3,271,367 | 9/1966 | Schnell et al. | 528/171 |
| 3,271,368 | 9/1966 | Goldberg et al. | 528/174 |
| 3,280,078 | 10/1966 | Hostettler et al. | 528/370 |
| 3,461,187 | 8/1969 | Cantrill | 525/468 |
| 3,462,515 | 8/1969 | Cantrill | 525/468 |
| 3,670,051 | 6/1972 | Senge et al. | 260/873 |
| 3,687,895 | 8/1972 | Vernaleken et al. | 260/47 UA |
| 3,692,870 | 9/1972 | Schnell et al. | 260/861 |
| 3,716,571 | 2/1973 | Berlin et al. | 260/463 |
| 3,856,886 | 12/1974 | Margotte et al. | 260/873 |
| 3,991,009 | 11/1976 | Margotte et al. | 260/42.18 |
| 4,005,037 | 1/1977 | Mietzsch et al. | 525/468 |
| 4,107,386 | 8/1978 | Gruber et al. | 525/468 |

FOREIGN PATENT DOCUMENTS

| | | |
|---|---|---|
| 854761 | 10/1970 | Canada ................................. 525/468 |
| 932495 | 8/1973 | Canada . |
| 2057274 | 5/1972 | Fed. Rep. of Germany . |
| 2130028 | 12/1972 | Fed. Rep. of Germany . |
| 48-25076 | 7/1973 | Japan . |

OTHER PUBLICATIONS

Morrison, Organic Chemistry, 3rd Ed., pp. 208–215.
Schnell, Chemistry and Physics of Polycarbonates, pp. 20–24.
Billmeyer, Jr., Textbook of Polymer Sci., pp. 483–484.
Brandrup, Polymer Handbook, pp. II 105, II 303–306, II 318–322 & II 366–367.

*Primary Examiner*—John Kight, III
*Assistant Examiner*—Amelia B. Yarbrough
*Attorney, Agent, or Firm*—Gene Harsh; Lawrence S. Pope

[57] ABSTRACT

The subject disclosure is concerned with a process for synthesizing soluble thermoplastic graft polymers of polycarbonate and ethylenically unsaturated monomers by polymerizing these monomers and aromatic polycarbonates carrying addition polymerizable end groups in a dilute solution of no more than 30 wt. % of reactants based on the weight of solution. The graft polymers so obtained are also encompassed by the inventive concept.

5 Claims, No Drawings

GRAFT POLYCARBONATES, THEIR PREPARATION AND THEIR USE AS MOLDINGS

SUMMARY OF THE INVENTION

The present invention relates to a process for the preparation of soluble thermoplastic graft polycarbonates with molecular weights (weight average $\overline{M}_W$, measured by light scattering) of about 30,000 to 400,000, which is characterized in that aromatic polycarbonates with on average at least one unsaturated end group per polycarbonate molecule are polymerized by means of solution polymerization in the presence of monomers which can be polymerized under free radical conditions, during which the weight ratio of the starting polycarbonate to the monomers which can be polymerized under free radical conditions should be about 70:30 to 10:90, preferably about 70:30 to 40:60 and particularly preferably about 65:35 to 45:55, and during which the concentration of the reaction solution should not exceed about 30% by weight, relative to the total weight of polycarbonate with unsaturated end groups, monomers which can be polymerized under free radical conditions and reaction medium.

The end products formed are branched high-molecular thermoplastic compounds which are built up from polycarbonate segments (PC) and polymer segments (PM). U.S. Pat. No. 3,462,515 describes a radical polymerisation for example of styrene in the presence of aromatic polycarbonates which do not contain any functional groups.

U.S. Pat. No. 4,005,037 describes a radical polymerization of vinylchloride onto aromatic polycarbonates preferably onto polycarbonates derived from O, O', O'', O'''-tetramethyl-bisphenols. Any graft polymerization reaction is only possible by a radical transferreaction onto the aromatical methyl substituents of the tetramethylbisphenol-polycarbonates. Any graft polymerization reaction onto unsaturated groups of the polycarbonate, according the instant invention, is not subject of U.S. Pat. No. 4,005,037. U.S. Pat. No. 3,991,009 describes mixtures of ABS-polymers with polycarbonate-graft-polymers. The polycarbonate-graft-polymers are prepared by interfacial polycondensation of polycarbonates in the presence of OH-groups containing vinyl-polymerisates. The preparation and structure of the polycarbonate-graft polymers are clearly different from those of the polycarbonate-graft-polymers of instant invention. U.S. Pat. No. 3,856,886 describes corresponding mixtures. U.S. Pat. No. 3,687,895 describes the preparation of the polycarbonate-graft polymers, used in the mixtures according U.S. Pat. No. 3,991,009 and U.S. Pat. No. 3,856,886.

U.S. Pat. No. 3,692,870 describes the graft reaction of vinyl monomers onto polycarbonates containing alkyl groups. It was not obvious that the polycarbonate-graft polymers obtained according instant invention having not more than two grafted branches possess an improved quality of properties compared with the products obtained according U.S. Pat. No. 3,692,870. This may be caused by the fact, that the products according U.S. Pat. No. 3,692,870 have a statistical distribution of the position being capable for grafting, and it may be also caused by the fact that the radical graft-reaction is disturbed by transfer-reactions of the alkyl groups of the polycarbonate.

U.S. Pat. No. 3,670,051 describes also polycarbonate-graft-polymers having a different preparation and structure from those of the polycarbonate-graft-polymers according instant invention.

U.S. Pat. No. 3,461,187 describes the preparation of polycarbonates in a homogen phase in the presence of polymerisates containing carboxyl groups. The grafted vinyl polymers being obtained contain polycarbonate branches which are linked on one side with the vinyl polymers via carboxyl ester groups and which are chain terminated on the other side by the chain-terminator used (compare for example the Example 4 of U.S. Pat. No. 3,461,187).

DETAILED DESCRIPTION OF THE INVENTION

The aromatic polycarbonates containing polymerizable end groups and suitable for the process according to the invention have the general formula I

E—(PC)—E    I wherein E can represent a saturated end group or an unsaturated end group which can be polymerized under free radical conditions and PC represents a polycarbonate segment, with the proviso that on average at least one unsaturated end group which can be polymerized under free radical conditions to at most two unsaturated end groups which can be polymerized under free radical conditions are present per polycarbonate molecule.

The aromatic polycarbonates required for the process according to the invention are characterized, in particular, by the general formula II

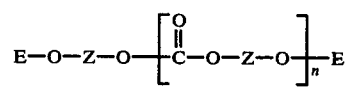

in which
  Z=a radical of a diphenol, preferably with 6 to 30 C atoms, and
  n=an integer from 30 to 100, preferably from 40 to 80,
and in which E has the meaning indicated for the polycarbonates of the formula I.

E should preferably correspond to the general formula IIIa

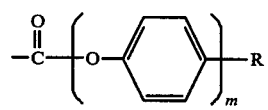

IIIa/IIIb in which
  m denotes zero or 1 and
  R denotes

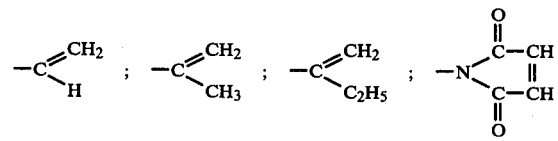

or —CH—CH=CH$_2$.

Saturated end groups E in the sense of the present invention are preferably those of the formula IIIb in which m is zero and R is C$_1$-C$_{18}$-alkyl, or in which m is 1 and R is H, alkyl, such as, for example CH₃ or tert.-C₄H₉, or halogen, such as Cl or Br.

The aromatic polycarbonates to be used for the process according to the invention can be prepared by customary processes, either in a homogeneous phase system or in a heterogeneous phase system, and by melt transesterification.

As a rule, the aromatic polycarbonates to be used for the process according to the invention have molecular weights (number average $\overline{M}n$, measured by membrane osmosis) of about 7,000–25,000, preferably of about 10,000–20,000.

They are preferably prepared by reacting diphenols and phosgene in a heterogeneous mixture of aqueous sodium hydroxide solution and organic solvents, such as, for example, methylene chloride or chlorobenzene, in the presence of compounds of the formula IVa, and if appropriate of the formula IVb

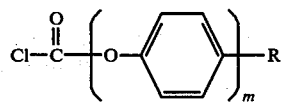

IVa/IVb wherein R and m have the meaning indicated for formula IIIa or IIIb, and wherein the molar ratio of the mols of compounds Iva employed in each case to the molar sum of the mols of compounds IVa+IVb employed in each case is at least ½ and at most 1. Instead of the chlorocarbonic acid esters or acid chlorides, the compounds of the formulae IVa and IVb can in some cases also be employed via the corresponding phenolic components of the formulae Va, and if appropriate Vb

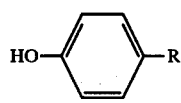

Va/Vb wherein R has the meaning given for formulae IIIa or IIIb.

In accordance with formula II, the following diphenols, from which the above-mentioned diphenol radicals Z result, are suitable, for example, for the preparation of the aromatic polycarbonates which can be employed for the process according to the invention: hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl)sulphoxides, bis-(hydroxyphenyl)sulphones, bis-(hydroxyphenyl) ketones and α,α-bis-(hydroxyphenyl)-diisopropylbenzene, and nuclear-alkylated and nuclear-halogenated compounds thereof.

These and other suitable diphenols are described, for example, in U.S. Pat. Nos. 3,028,365; 2,999,835; 3,148,172; 3,271,368; 2,991,273; 3,271,367; 3,280,078; (German Published Specifications) Nos. 1,570,703; 2,063,050; 2,063,052; 2,211,956; and 2,211,957, French patent specification No. 1,561,518 and in the monograph H. Schnell, *Chemistry and Physics of Polycarbonates*, Interscience Publishers, New York, 1964.

Preferred diphenols are, for example: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Examples of suitable monofunctional chain regulators containing polymerizable double bonds, according to formula IVa, are acrylic acid chloride, methacrylic acid chloride, isopropenylphenyl chlorocarbonate, p-hydroxystyrene chlorocarbonate and p-hydroxy-α-methylstyrene chlorocarbonate.

Examples of suitable phenolic monofunctional chain regulators containing unsaturated groups according to Va are p-hydroxystyrene, allylphenol or p-hydroxyphenylmaleimide.

Examples of suitable saturated chain regulators of the formula IVb are acetyl chloride, stearyl chloride and phenyl chlorocarbonate; examples of suitable saturated chain regulators of the formula Vb are phenol, p-methylphenol, p-tert.-butylphenol, p-chlorophenol and p-bromophenol.

The amount of chain regulators for the preparation of the starting polycarbonates is calculated from the desired molecular weight, and in particular in a manner which is simple to the expert, since the reaction of the chain regulator proceeds quantitatively. The amount of chain regulator is between about 7 mol% and 2 mol%, relative to mols of diphenols employed in each case.

Vinyl monomers and acrylic monomers, above all, are suitable for the preparation, according to the invention, of the graft polycarbonates.

In the present connection, vinyl monomers include vinyl acetate, vinyl benzoate, vinyl isobutyl ether, styrene, vinyltoluene, 2,4-dimethylstyrene, chloro or bromostyrene, α-methylstyrene, vinyl chloride, vinylidene chloride and ethylene, propylene and butadiene.

In the present connection, acrylic monomers include acrylic acid, acrylamide, methacrylamide, N-methoxymethacrylamide, acrylonitrile, methacrylonitrile and (meth)acrylic acid esters, for example methyl methyacrylate, ethyl acrylate, butyl acrylate, n-hexyl acrylate, cyclohexyl methacrylate and glycidyl methacrylate.

The monomers which can be polymerized under free radical conditions can be employed in the process according to the invention by themselves and in combination with one another.

The polymerization of the monomers with the aromatic polycarbonates containing end groups which can be polymerized under free radical conditions is preferably effected by solution polymerization in inert solvents at temperatures in the range of about 30°–100° C. using initiators suitable for free radical polymerization. To avoid crosslinking reactions, either the chain regulators customary for free radical polymerization reactions or polycarbonates with on average only one unsaturated end group which can be polymerized under free radical conditions per polycarbonate molecule are employed.

Preferred solvents are: benzene, chlorobenzene or toluene, and mixtures thereof. Preferred reaction temperatures are in the range of about 50°–90° C. and preferred free radical forming agents are peroxides and azo compounds, such as benzyl peroxide or azodiisobutyric acid nitrile. Dodecylmercaptan, for example, can be employed as a chain regulator for the free radical polymerization.

The following conditions must be taken into consideration in the procedure, according to the invention, for the preparation of the graft polycarbonates: the concentration of the reactants (polycarbonates containing end groups which can be polymerized under free radical conditions, and monomers) in the reaction medium can be at most about 30% by weight, relative to the total weight of reactants and reaction medium. The reaction procedure is controlled with regard to free radical forming agent, reaction temperature, reaction time, concentration and chain regulator in a manner such that molecular weights (weight average, $\overline{M}w$, measured by light scattering) in the range of about 30,000–400,000, preferably about 30,000–200,000, are obtained in the end product.

The reaction product is predominantly a graft polymer of (PC) segments and (PM) segments. In addition, however, it is also possible for minor amounts of polymers of the monomers which can be polymerized under free radical conditions to be present, which are not linked to the polycarbonate segment.

In the case where minor amounts of polymers are formed in addition to the graft polycarbonates, the above-mentioned molecular weight ranges are understood as average values, relative to the total mixture of polymers.

To carry out the process according to the invention in an optimum manner, a concentration range of about 10–20% by weight, relative to the total weight of reactants and reaction medium, is desirable.

The ratio of starting polycarbonates to the monomers which can be polymerized under free radical conditions can be varied within wide limits in the grafting reaction according to the invention, and depends primarily on the desired composition of the grafted end product. Since the reaction essentially proceeds quantitatively, the weight ratio of the reactants thus essentially corresponds to the weight ratio in the end product of the substances employed.

The weight ratio of the starting polycarbonates to the monomers which can be polymerized under free radical conditions can thus vary from about 70:30 to 10:90. The preferred weight ratio of the reactants should be between about 70:30 and 40:60, and a reactant ratio of about 65:35 to 45:55 is particularly preferred.

The present invention thus also relates to polycarbonates which contain polycarbonate segments (PC) and polymer segments (PM) in various arrangements.

The present invention relates, in particular, to graft polycarbonates obtainable by the process according to the invention by free radical polymerization of monomers which can be polymerized under free radical conditions onto polycarbonates containing groups which can be polymerized under free radical conditions.

The isolation of the graft polycarbonate according to the invention is effected either by precipitating the products from the polymer solutions with precipitating agents such as methanol, cyclohexane or petroleum ether, or by evaporating off, in, for example, devolatilization extruders, the solvent employed for the free radical polymerization.

The pattern of properties of the graft polycarbonates thus depends, on the one hand, on the desired proportions of PC segments and PM sements and, on the other hand, on the molecular weight produced in the end product.

The graft polycarbonates obtainable according to the invention combine the good properties of polycarbonates, such as impact strength, notched impact strength and heat distortion point, with the good properties of polymers, such as stability to hydrolysis, processing properties and stability to weathering.

However, it is surprising that the polycarbonates obtainable according to the invention have a good solubility in solvents suitable for conventional polycarbonates, such as methylene chloride and chlorobenzene, and can thus be processed as thermoplastics in a wide temperature range as branched but non-crosslinked polymers, for example, they can be injection-molded or extruded to given any desired moldings and films.

The customary additives known for polycarbonates and vinyl polymers, such as, for example, heat stabilizers, UV stabilizers and flameproofing agents, and reinforcing fillers, such as, for example, glass fibers or asbestos, can be admixed in a known manner to the graft polycarbonates obtainable according to the invention.

The subject of the invention will be illustrated further by the following examples.

Preparation of the Starting Polycarbonates

EXAMPLE 1

Polycarbonate of 97 mol% of 4,4'-dihydroxydiphenylpropane (bisphenol A) and 3 mol% of methacrylic acid chloride with a relative solution viscosity of 1.30, measured in methylene chloride at 25° C. and at a concentration of 5 g/l. The molecular weight $\overline{M}n$, measured by membrane osmosis, is 13,800.

EXAMPLE 2

Polycarbonate of 83 mol% of bisphenol A, 10 mol% of tetrabromobisphenol A and 7.0 mol% of p-hydroxystyrene. The relative solution viscosity is 1.22. The molecular weight $\overline{M}n$, determined by membrane osmosis, is 10,500.

EXAMPLE 3

As 1, but 1.5 mol% of methacrylic acid chloride and 1.5 mol% of p-tert.-butylphenol. $\eta_{rel.} = 1.295$, and the molecular weight $\overline{M}n$, measured by membrane osmosis is 13,500.

Preparation of the Graft Polycarbonates 4,000 g of chlorobenzenes are initially introduced into the reaction vessel and 500 g of the polycarbonate, containing unsaturated end groups, from Example 1 are dissolved therein at 90° C. When solution is complete, 360 g of styrene, 140 g of acrylonitrile and 10 g of azodiisobutyric acid nitrile (ADBN) are added. The reaction temperature is kept 80° C. In order to guarantee 100% conversion, 1 g of ADBN is added every 30 minutes. After a reaction time of 6 hours, 100% conversion is achieved. The relative solution viscosity, measured in methylene chloride at 25° C. and at a concentration of 5 g/l, is 1.40. The molecular weight, measured by light scattering in chloroform, is 65,000.

The following table shows some further examples, the amount of chlorobenzene polycarbonate monomer which can be polymerized under free radical conditions and initiator being found in the table.

| Example | | 4 | 5 | 6 | 7 | 8 |
|---|---|---|---|---|---|---|
| Polycarbonate from Example 1 | parts by weight | 1,000 | 1,300 | — | — | — |
| Polycarbonate from Example 2 | " | — | — | 600 | 675 | — |
| Polycarbonate from Example 3 | " | — | — | — | — | 10,500 |

-continued

| Example | | 4 | 5 | 6 | 7 | 8 |
|---|---|---|---|---|---|---|
| Chlorobenzene | " | 8,000 | 8,000 | 9,000 | 8,500 | 8,000 |
| Styrene | " | 720 | 504 | — | 825 | 504 |
| Acrylonitrile | " | 280 | 196 | — | — | 196 |
| Methyl methacrylate | " | — | — | 400 | — | — |
| Total ADBN | " | 40 | 40 | 25 | 35 | 45 |
| Reaction temperature | °C. | 80 | 80 | 80 | 80 | 80 |
| Reaction time for 100% conversion | hours | 6 | 5 | 11 | 9 | 12 |
| Relative solution viscosity | | 1.40 | 1.38 | 1.41 | 1.42 | 1.53 |
| $M_w$ (light scattering) measured in chloroform | | 65,000; | 71,000; | 75,000; | 77,400; | 180,000 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the production of soluble thermoplastic graft polycarbonate with a molecular weight (weight average Mw) of about 30,000 to 400,000, in which an aromatic polycarbonate with on average at least one unsaturated end group per polycarbonate molecule, having the formula II

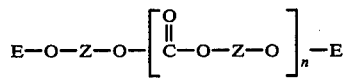

in which
Z = a radical of a diphenol,
n = an integer from 30 to 100, and
E represents a saturated end group of the formula IIIb or an unsaturated end group of the formula IIIa

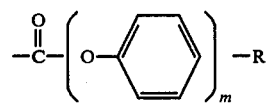    IIIa/IIIb in which for IIIa, m denotes zero and R denotes

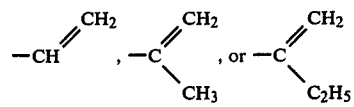

and in which for IIIb, m is zero and R is $C_1$-$C_{18}$-alkyl or m is 1 and R is H, alkyl or halogen, is polymerized by means of solution polymerization in the presence of monomers which can be polymerized under free radical conditions, selected from vinyl monomers and acrylic monomers, during which the weight ratio of the starting polycarbonate to the monomers which can be polymerized under free radical conditions is about 70:30 to 10:90, and during which the concentration of the reaction solution does not exceed about 30% by weight, relative to the total weight of polycarbonate with unsaturated end groups, monomers which can be polymerized under free radical conditions and reaction medium.

2. A process according to claim 1, in which an aromatic polycarbonate with on average only one unsaturated end group per polycarbonate molecule is polymerized.

3. A process according to claims 1 or 2, in which the weight ratio of the starting polycarbonate to the monomer which can be polymerized under free radical conditions is about 70:30 to 40:60.

4. A process according to claim 3, in which the weight ratio of the starting polycarbonate to the monomer which can be polymerized under free radical conditions is about 65:35 to 45:55.

5. A thermoplastic graft polycarbonate produced by the process of claims 1 or 2.

* * * * *